United States Patent [19]
Cohen et al.

[11] Patent Number: 5,165,222
[45] Date of Patent: Nov. 24, 1992

[54] RACING BLANKET FOR GREYHOUND DOGS

[75] Inventors: David S. Cohen, Beverly; Melvin I. Loman, Peabody, both of Mass.

[73] Assignee: Halemar Specialties, Inc., Peabody, Mass.

[21] Appl. No.: 775,426

[22] Filed: Oct. 15, 1991

[51] Int. Cl.⁵ .............................................. B68C 5/00
[52] U.S. Cl. ...................................... 54/79.2; 40/303
[58] Field of Search ............... 54/79, 66, 67; 119/143, 119/96; 40/300, 303

[56] References Cited

U.S. PATENT DOCUMENTS

| | | | |
|---|---|---|---|
| 260,472 | 7/1882 | Frost | 54/79 |
| 448,376 | 3/1891 | Sisson | 54/79 |
| 829,904 | 8/1906 | Young | 54/79 |
| 940,967 | 11/1909 | Hasting | 54/79 |
| 1,595,834 | 8/1926 | Griffiths | 54/79 |
| 1,926,420 | 9/1933 | Renfro | 40/303 |
| 2,850,860 | 9/1958 | Torell et al. | 54/79 |
| 4,788,941 | 12/1988 | Villeneuve | 119/96 |

FOREIGN PATENT DOCUMENTS 2223390 4/1990 United Kingdom ................... 54/79

Primary Examiner—John J. Wilson
Assistant Examiner—Todd E. Manahan
Attorney, Agent, or Firm—Paul J. Cook

[57] ABSTRACT

A racing blanket for greyhound dogs is provided wherein a rearward section of the blanket is secured about the dog's stomach by a single buckle comprising two buckle sections attached to elastic straps. The engaged buckle is positioned on the blanket at the dog's side and a loop is positioned to hold the buckle away from direct contact with the dog.

6 Claims, 4 Drawing Sheets

RACING BLANKET FOR GREYHOUND DOGS

BACKGROUND OF THE INVENTION

This invention relates to a racing identification blanket for racing greyhound dogs.

Blankets are provided on greyhound dogs in order to identify the animal by a number on the blanket and by blanket color during the race. It is necessary that the blanket be worn sufficiently loose to avoid restricting the animal's ability to run while, at the same time, remaining firmly in place so as to avoid the dog's losing the blanket during a race. If a blanket is lost by the racing dog during the race, the race is voided. This results in needless costly expense. At the present time, racing blankets are designed so that a permanent loop is positioned at the front of the dog about its chest and a detachable loop is formed around the dog's stomach. The detachable loop is formed by securing two straps together by means of discrete snap fittings. The straps are secured to the main portion of the blanket by an elasticized strap portion which is free to expand and contract while the dog is running. The snap fittings require that each snap be attached individually and manually. This is time consuming and, since the snaps are positioned beneath the dog, the operator can only feel and not see if the snaps are in place. In addition, the snaps can become detached while the dog is running since the portion of the strap to which the snaps are attached is non-elastic. In addition, the snaps are located at the dog's stomach where significant body movement occurs during running and where irritation due to contact of the snaps and the stomach can occur.

Accordingly, it would be desirable to provide a racing blanket which can be positioned quickly and easily. In addition, it would be desirable to provide such a blanket which does not encumber a dog's running and which can not become detached while the dog is running.

SUMMARY OF THE INVENTION

This invention provides a racing blanket for a greyhound dog having a body section, an elastic band which can be adjustable secured to the body section and which extends about the front chest above the forward legs of the dog and a rearwardly positioned strap formed of two strap sections. Each strap section is secured at one end to the body section. Buckle sections are secured to the free ends of the strap sections. One buckle section includes three prongs; a central stationary prong and two flexible end prongs. The second buckle section includes holes for accommodating the prongs. The flexible prongs each include an exterior lip which fits an edge surface of the buckle section having the holes that accommodate the prongs. A loop on the body section holds the buckle in place against a side of the dog.

DESCRIPTION OF SPECIFIC EMBODIMENTS

Figure 1:
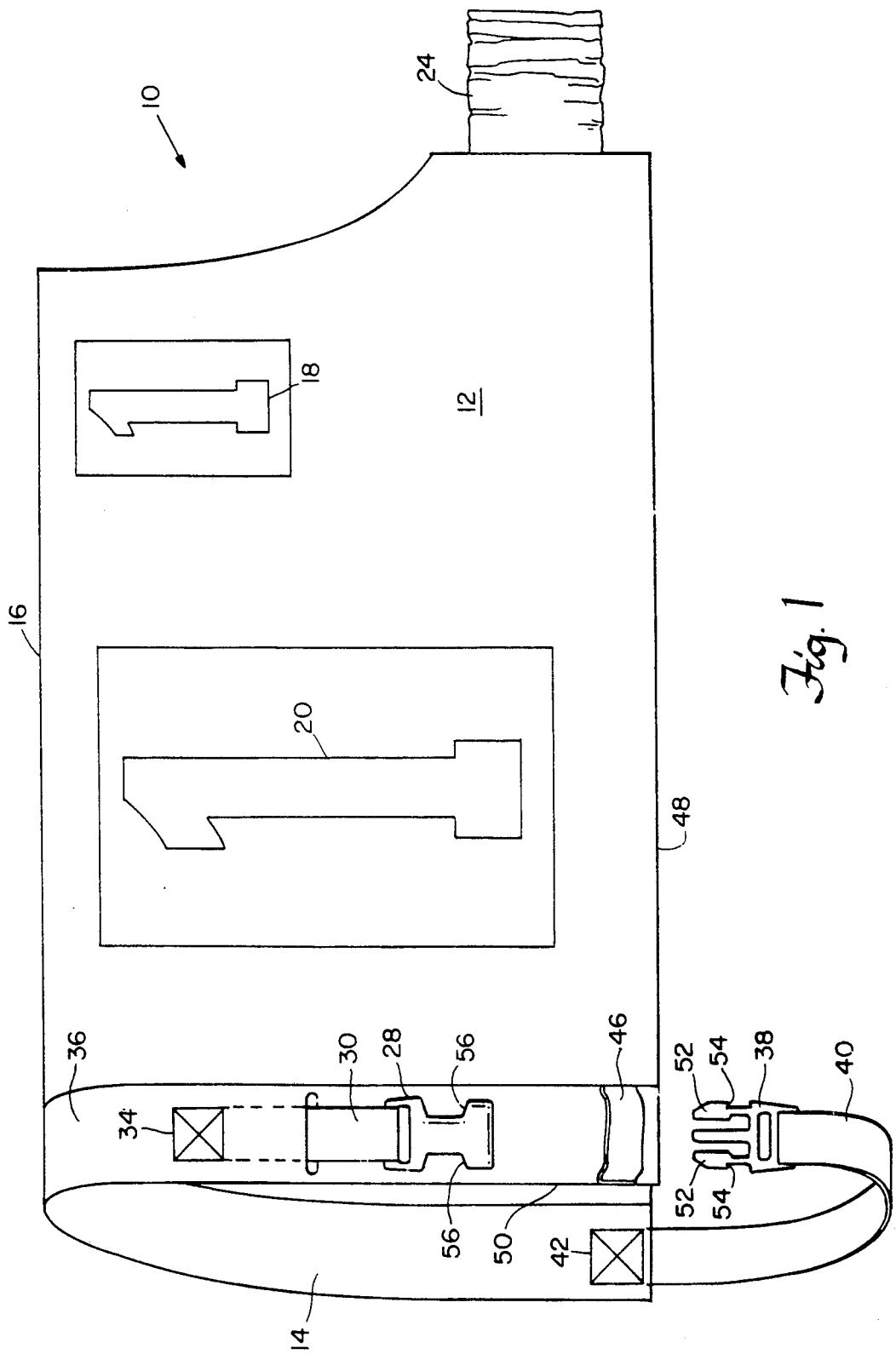
FIG. 1 is a side view of the racing blanket of this invention.
Figure 2:
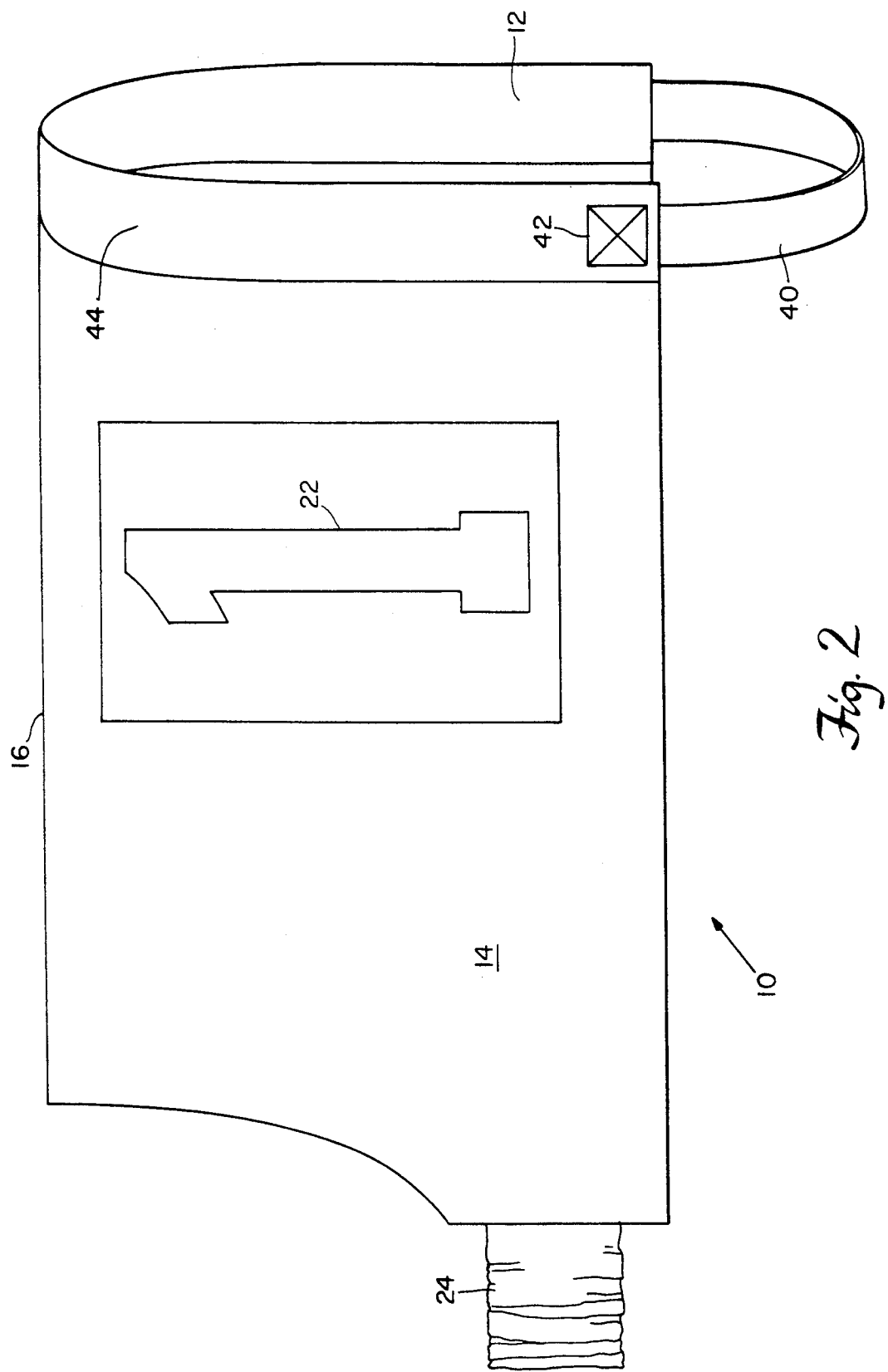
FIG. 2 is a side view of the racing blanket of FIG. 1 from the side opposite to that of FIG. 1.
Figure 4:
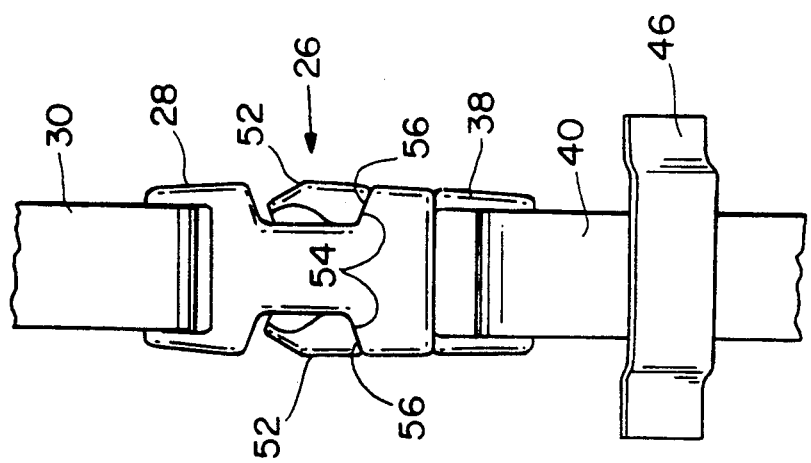
FIG. 4 is a side view of the opened buckle of FIG. 1 in the closed position.

Referring to FIGS. 1, 2 and 4, the racing blanket of this invention 10 includes a first side 12 and a second side 14. The sides 12 and 14 are joined or can comprise a single piece of cloth so that, when the blanket 10 is positioned on the dog, the top 16 is adjacent the dog's spine. The blanket includes numerals 18, 20 and 22 which, together with the color of blanket 10 serve to identify the dog during a race. The blanket 10 includes an elastic band 24 which is joined to the sides 12 and 14 and, when positioned on the dog, is located about the front chest of the dog and above the forward legs so as to secure the front portion of the blanket 10 on the dog. The rearward portion of the blanket 10 is positioned on the dog by means of buckle 26. A first buckle section 28 is secured, such as by sewing to a first elastic strap section 30 which is sewn to the blanket with threads 34 and inside a sleeve 36. The sleeve 36 is not required but is preferred as a guide to position the elastic strap section 30 and attached buckle section 28 is a desired forward position. A second buckle section 38 is attached to a second strap section 40, which, in turn, is sewn by threads 42 inside of sleeve 44. Sleeve 44 is not required but is preferred to assist in properly positioning buckle section 38. A loop 46, through which buckle section 38 extends, is provided to position the buckle 26 against the side of the dog while the dog is running. In addition, the loop prevents direct contact of the buckle with the dog. The length and elasticity of the strap section 30 between the threads 34 and buckle section 28 is controlled so that the buckle 26 does not extend below bottom surface 48 thereby preventing direct contact of the buckle 26 with the dog. There is only indirect contact of the buckle 26 to the dog with the side section 12 being interposed therebetween. In addition, the loop 46 prevents positioning the buckle 26 beyond the rearward surface 50 of the blanket 10 thereby preventing direct contact of the buckle 26 with the dog. However, the loop 46 and sleeves 36 and 44 do not restrict the elastic strap section 30 and 40 from expanding and contracting to accommodate the movement of the racing dog without restricting its ability to run. If desired, the position of the buckle section 28 and buckle section 38 can be reversed.

Referring to FIG. 4, the buckle 26 is shown with buckle sections 28 and 38 joined. The flexible prongs 52 include lips 54 which are positioned on edges 56 of buckle section 28. Due to the interaction of the lips 54 and edges 56, the buckle sections 28 and 38 cannot be pulled apart. In order to release the buckle 26, the prongs 52 are manually pushed together to disengage the lips 54 and edges 56. This type of force is not encountered while the dog is running so that buckle 26 cannot be released during a race.

Figure 3:
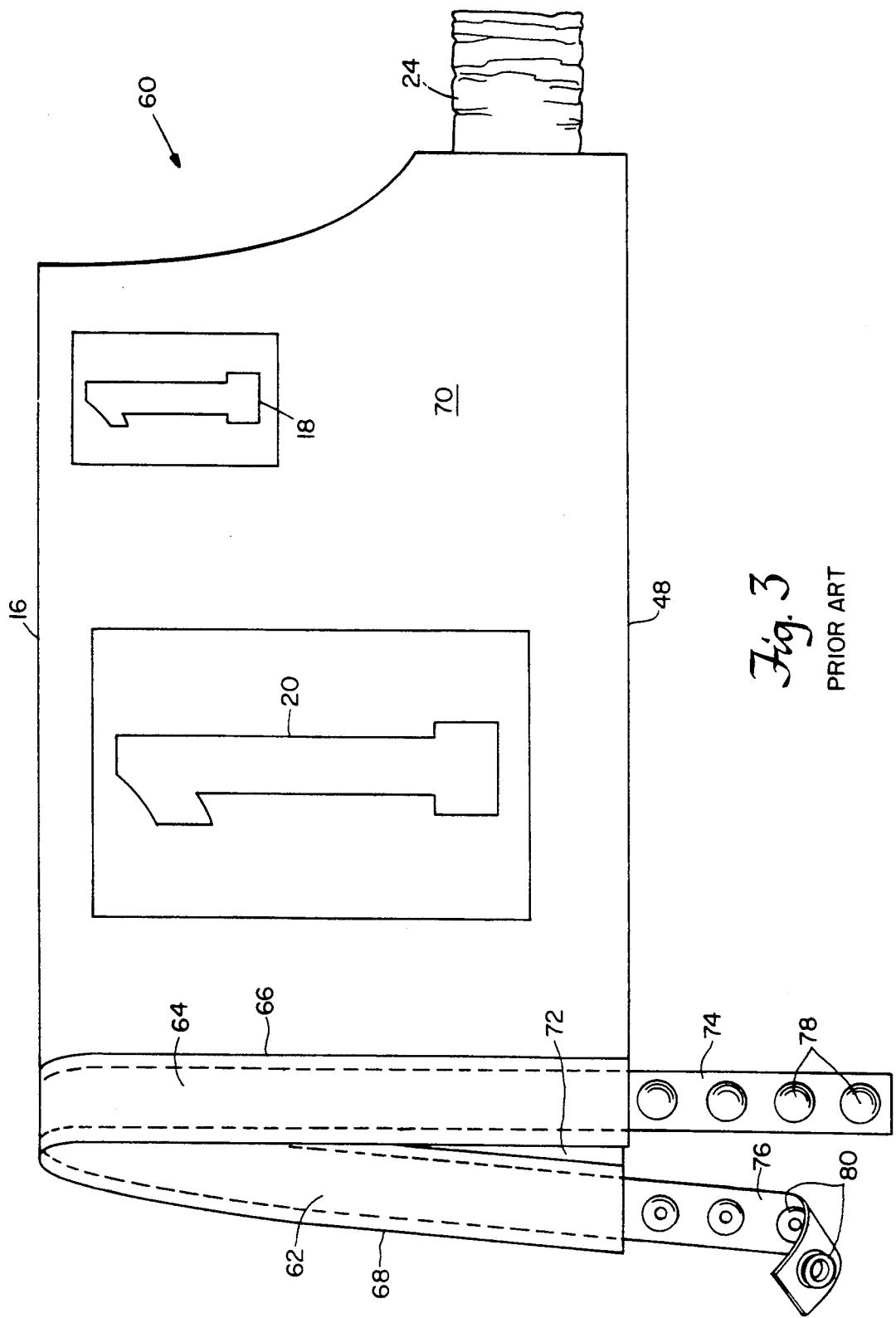
FIG. 3 is a side view of a racing blanket of the prior art.

Referring to FIG. 3 of the prior art racing blanket 60, wherein the elements comprising the same elements as the blanket 10 of this invention are identified by the same reference numerals. The rearward strap sections 62 and 64 are formed of an elastic material and extend through sleeves 66 and 68 sewn onto the body sections 70 and 72. The ends 74 and 76 are joined together by mating snap portions 78 and 80. The snap portions 78 and 80 extend through the thickness of ends 74 and 76 so that, in use, the snaps directly contact and irritate the running dog when the blanket 60 is in use. In addition, the snaps must be individually engaged at the dog's stomach from a position which is difficult to see the correct snap alignment. No means are provided for positioning the snaps at one side of the dog rather than the dog's stomach. In addition, while the animal is running, the engaged snaps are subjected to a pulling force which can cause the snaps to disengage.

Figure 5:
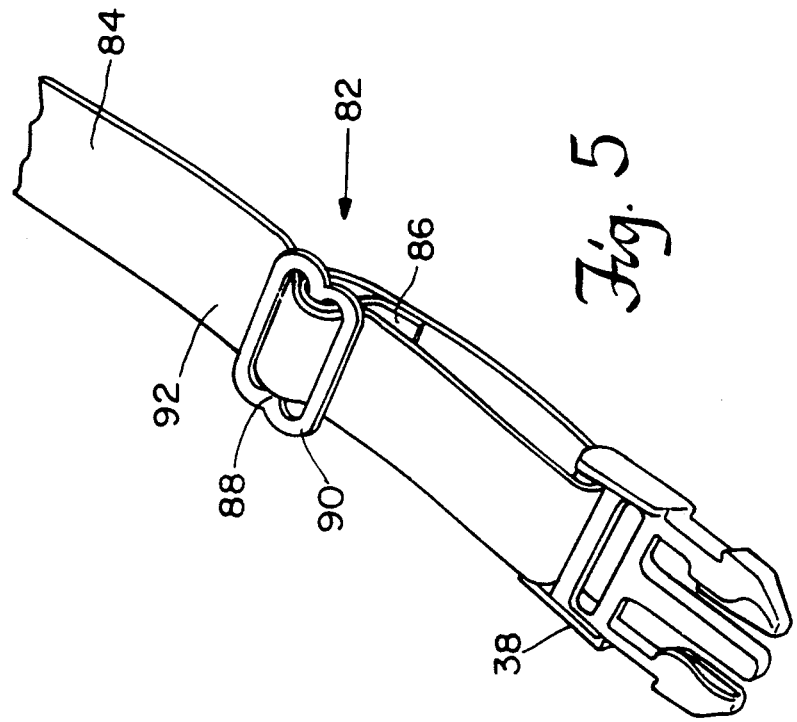
FIG. 5 shows an alternative strap section which is adjustable in length.

FIG. 5 shows an alternative second elastic strap section 82 which is adjustable in length. The end 84 is sewn into the side 12 by threads 42. The buckle section 38 functions as described above. The second end 86 is looped over arm 88 of adjusting buckle 90 and sewn to itself. The strap 92 also is threaded over arm 88. Buckle 90 can be moved along the length of the strap 92 thereby to adjust the effective length of strap 92 between threads 42 and buckle section 38.

We claim:

1. A racing blanket for a dog which comprises:
   a body section comprising two side sections joined together to fit over the sides and the spine of the dog,
   an elastic band connected to said side sections and fit about a forward portion of the dog and about the chest of the dog,
   a rearward strap positioned at a rearward edge of said body section to fit about the stomach of the dog and formed by joining a first elastic strap section secured to a first buckle section having holes and a second elastic strap section secured to a second buckle section,
   said second buckle section having a central rigid prong and two end flexible prongs, said flexible prongs each having an exterior lip,
   said central prong and said flexible prongs having a size to fit in holes of said first buckle section and each of said lips positioned to fit an edge surface of said first buckle section,
   said first strap section joined at one end to a first side section of said two side sections and said second strap section joined at one end to a second side section of said two side sections,
   and a loop secured to a side section and positioned to retain a buckle formed by joining said first buckle section and said second buckle section against one of said side sections.

2. The racing blanket of claim 1 wherein one end of one of said strap section is positioned within a sleeve on the respective one of said side section.

3. The racing blanket of claim 2 wherein one of said elastic strap sections is adjustable in length.

4. The racing blanket of claim 1 wherein one end of each of said strap sections is positioned within a sleeve on the respective of said side sections.

5. The racing blanket of claim 4 wherein one of said elastic strap sections is adjustable in length.

6. The racing blanket of claim 1 wherein one of said elastic strap sections is adjustable in length.

* * * * *